United States Patent
Lee et al.

(10) Patent No.: US 10,766,815 B2
(45) Date of Patent: Sep. 8, 2020

(54) ENGINEERED STONE AND MANUFACTURING METHOD THEREOF

(71) Applicant: Lotte Advanced Materials Co., Ltd., Yeosu-si (KR)

(72) Inventors: Heecheol Lee, Uiwang-si (KR); Cheol-Yeon Hwang, Uiwang-si (KR); Kyunghwan Kim, Uiwang-si (KR); Seul-Gi Bae, Uiwang-si (KR); Changho Son, Uiwang-si (KR); Sung Jin An, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 262 days.

(21) Appl. No.: 15/807,673

(22) Filed: Nov. 9, 2017

(65) Prior Publication Data

US 2018/0179110 A1 Jun. 28, 2018

(30) Foreign Application Priority Data

Dec. 23, 2016 (KR) ........................ 10-2016-0178218

(51) Int. Cl.

| | | |
|---|---|---|
| *C04B 26/18* | (2006.01) | |
| *C04B 14/06* | (2006.01) | |
| *C04B 18/02* | (2006.01) | |
| *B29C 43/56* | (2006.01) | |
| *B29C 67/24* | (2006.01) | |
| *C04B 14/00* | (2006.01) | |
| *C04B 16/00* | (2006.01) | |
| *C09K 11/02* | (2006.01) | |
| *C04B 111/80* | (2006.01) | |
| *C04B 111/54* | (2006.01) | |
| *B29K 67/00* | (2006.01) | |
| *B29K 105/24* | (2006.01) | |
| *B29K 509/08* | (2006.01) | |
| *C04B 103/54* | (2006.01) | |
| *C04B 111/00* | (2006.01) | |
| *C04B 111/82* | (2006.01) | |

(52) U.S. Cl.
CPC .............. *C04B 26/18* (2013.01); *B29C 43/56* (2013.01); *B29C 67/244* (2013.01); *C04B 14/00* (2013.01); *C04B 14/005* (2013.01); *C04B 16/00* (2013.01); *C04B 18/022* (2013.01); *C09K 11/025* (2013.01); *B29C 2043/563* (2013.01); *B29K 2067/06* (2013.01); *B29K 2105/24* (2013.01); *B29K 2509/08* (2013.01); *B29K 2995/0018* (2013.01); *B29K 2995/0026* (2013.01); *C04B 2103/54* (2013.01); *C04B 2111/00965* (2013.01); *C04B 2111/54* (2013.01); *C04B 2111/542* (2013.01); *C04B 2111/807* (2013.01); *C04B 2111/82* (2013.01)

(58) Field of Classification Search
CPC ....... C04B 14/00; C04B 14/005; C04B 14/06; C04B 14/062; C04B 2103/54; C04B 26/18; C04B 18/022
See application file for complete search history.

(56) References Cited

U.S. PATENT DOCUMENTS

| | | | |
|---|---|---|---|
| 6,136,226 A | 10/2000 | Sakai | |
| 2007/0244222 A1 | 10/2007 | Ghahary et al. | |
| 2013/0168607 A1* | 7/2013 | Lee | .......................... B44F 1/08 |
| | | | 252/301.36 |
| 2014/0179847 A1 | 6/2014 | Hwang et al. | |
| 2015/0344377 A1 | 12/2015 | Lee et al. | |

FOREIGN PATENT DOCUMENTS

| | | |
|---|---|---|
| CN | 1362440 A | 8/2002 |
| CN | 101058492 A | 10/2007 |
| CN | 101818553 A | 9/2010 |
| CN | 102531468 A | 7/2012 |
| CN | 103288384 A | 9/2013 |
| CN | 103408250 A | 11/2013 |
| EP | 0483892 A1 | 5/1992 |
| EP | 2610227 A2 | 7/2013 |
| KR | 10-2005-0008218 A | 1/2005 |
| KR | 10-0466697 B1 | 5/2005 |
| KR | 10-2009-0088147 A | 8/2009 |
| KR | 10-2013-0077312 A | 7/2013 |

(Continued)

OTHER PUBLICATIONS

Search Report in counterpart European Application No. 17200437.6 dated Apr. 24, 2018, pp. 1-7.
Office Action in counterpart Chinese Application No. 201711078692.1 dated Mar. 18, 2020, pp. 1-7.
English-translation of Office Action in counterpart Chinese Application No. 201711078692.1 dated Mar. 18, 2020, pp. 1-7.

*Primary Examiner* — Karuna P Reddy
(74) *Attorney, Agent, or Firm* — Additon, Higgins & Pendleton, P.A.

(57) ABSTRACT

An engineered stone includes a light transmitting mother material (I) and a phosphorescent chip (II). The light transmitting mother material (I) includes about 7 wt % to about 12 wt % of an unsaturated polyester resin (A), about 88 wt % to about 93 wt % of a silica-containing compound (B) and about 0.01 part by weight to about 1 part by weight of an organic/inorganic pigment (C) based on about 100 parts by weight of the unsaturated polyester resin (A). The phosphorescent chip (II) includes about 8 wt % to about 15 wt % of an unsaturated polyester resin (A'), about 85 wt % to about 92 wt % of a silica-containing compound (B') and about 2 parts by weight to about 10 parts by weight of a phosphorescent pigment (D) based on about 100 parts by weight of the unsaturated polyester resin (A').

14 Claims, 3 Drawing Sheets

(56) References Cited

FOREIGN PATENT DOCUMENTS

| KR | 10-2013-0077680 A | 9/2013 |
| KR | 10-2014-0045218 A | 4/2014 |
| KR | 10-2013-0077142 A | 5/2015 |
| KR | 10-2015-0137529 A | 12/2015 |
| KR | 10-1596545 B1 | 2/2016 |
| KR | 10-1605584 B1 | 3/2016 |
| KR | 10-2016-0073313 A | 6/2016 |

* cited by examiner

ENGINEERED STONE AND MANUFACTURING METHOD THEREOF

CROSS-REFERENCE TO RELATED APPLICATION

This application claims priority to and the benefit of Korean Patent Application No. 10-2016-0178218 filed in the Korean Intellectual Property Office on Dec. 23, 2016, the entire disclosure of which is incorporated herein by reference.

FIELD

An engineered stone and a manufacturing method thereof are disclosed.

BACKGROUND

Natural stones such as granite and marble can have beautiful patterns on the surface thereof and thus have been used as building decoration material. Recently, the demand for natural stones for use in applications such as flooring, wall panels, sinks, and the like has significantly increased. However, this demand may not be met only with high cost natural stones. Accordingly, various artificial stones are also being developed and used.

The artificial stones are classified into general artificial stones manufactured by adding various materials such as an inorganic filler, a colorant, a curing agent, and the like to an acryl-based or unsaturated polyester base resin and resin-based engineered stones (so called "engineering stones") manufactured by mixing an inorganic (silica-based) natural mineral and a binder resin to obtain a composition and then, vacuuming, vibrating, compressing, and molding the composition to have a texture of the natural stones.

The resin-based engineered stones may be manufactured to have various colors and textures depending on the kind of natural mineral, color of a resin or pigment, stirring process, and the like. Resin-based engineered stones may have more natural textures than the general artificial stones due to a use of the natural mineral as a main material and thus have recently been in increasing demand.

These resin-base engineered stones may be manufactured to have a single color, a multicolor tone by adding pigments having different colors from one another and mixing resin mixtures having various colors in a mixer, or a natural stone texture by using a chip.

To improve function and performance of an artificial marble, there have been attempts to impart luminance to the artificial marble by using a noctilucenct material such as a phosphorescent material and the like, a light emitting material such as an ultraviolet (UV) emitting material as well as ultraviolet (UV) absorbing material, and the like.

A conventional phosphorescent artificial marble may be manufactured by coating a phosphorescent pigment on the surface or creating a texture by using a phosphorescent chip. When the phosphorescent chip is used, uniform phosphorescence may not be obtained, and when the phosphorescent pigment is coated on the surface, the texture on the surface may be different from that of natural marble.

In addition, conventional phosphorescent artificial marble can include a large amount of the phosphorescent pigment to accomplish sufficient phosphorescence performance. However, the phosphorescent pigment is expensive and thus may increase manufacturing cost when used in a large amount and resultantly, can be an obstacle to commercial availability of the artificial marble. Accordingly, there is a need to provide sufficient phosphorescence with smaller amounts of the phosphorescent pigment.

The present inventors have researched an appropriate mixing ratio in order to solve this problem and resultantly developed a resin-based engineered stone capable of accomplishing phosphorescence which can maintain sufficient luminance for a long time as well as use a minimum amount of the phosphorescent pigment.

SUMMARY OF THE INVENTION

The present disclosure provides a resin-based engineered stone (also engineered stone) which can have differently appearing surface textures depending on illumination of lighting.

An engineered stone according to an embodiment of the present disclosure includes a light transmitting mother material (I) and a phosphorescent chip (II), wherein the light transmitting mother material (I) includes about 7 wt % to about 12 wt % of an unsaturated polyester resin (A) and about 88 wt % to about 93 wt % of a silica-containing compound (B), each based on a total amount (total weight, 100 wt %) of the unsaturated polyester resin (A) and the silica-containing compound (B) of the light transmitting mother material (I), wherein the light transmitting mother material (I) further includes about 0.01 part by weight to about 1 part by weight of an organic/inorganic pigment (C) based on about 100 parts by weight of the unsaturated polyester resin (A), wherein the phosphorescent chip (II) includes about 8 wt % to about 15 wt % of an unsaturated polyester resin (A') and about 85 wt % to about 92 wt % of a silica-containing compound (B'), each based on a total amount (total weight, 100 wt %) of the unsaturated polyester resin (A') and the silica-containing compound (B') of the phosphorescent chip (II), wherein the phosphorescent chip (II) further includes about 2 parts by weight to about 10 parts by weight of a phosphorescent pigment (D) based on about 100 parts by weight of the unsaturated polyester resin (A'), wherein the silica-containing compound (B') includes about 20 wt % to about 30 wt % of a silica powder (b1') based on a total amount (total weight, 100 wt %) of the phosphorescent chip (II).

The silica-containing compound (B) of the light transmitting mother material (I) may include a silica powder (b1), a silica sand (b2), and a quartz chip (b3).

An average particle diameter of the silica powder (b1) may be greater than about 0 μm and less than or equal to about 45 μm, an average particle diameter of the silica sand (b2) may be greater than or equal to about 0.1 mm and less than about 1.2 mm, and an average particle diameter of the quartz chip (b3) may be greater than or equal to about 1.2 mm and less than or equal to about 6.0 mm. The average particle size of the silica sand (b2) and the quartz chip (b3) in the light transmitting mother material (I) is not the same.

The silica powder (b1) may be included in an amount of about 20 wt % to about 30 wt % based on a total amount (total weight, 100 wt %) of the light transmitting mother material (I), the silica sand (b2) may be included in an amount of about 35 wt % to about 45 wt % based on a total amount (total weight, 100 wt %) of the light transmitting mother material (I), and the quartz chip (b3) may be included in a total amount (total weight, 100 wt %) of about 10 wt % to about 30 wt % based on a total amount of the light transmitting mother material (I).

The silica-containing compound (B') may include the silica powder (b1') and a silica sand (b2').

An average particle diameter of the silica powder (b1') may be greater than about 0 μm and less than or equal to about 45 μm and an average particle diameter of the silica sand (b2') may be greater than or equal to about 0.1 mm and less than about 1.2 mm.

The silica sand (b2') may be included in an amount of about 60 wt % to about 70 wt % based on a total amount (total weight, 100 wt %) of the phosphorescent chip (II).

An average particle diameter of the phosphorescent pigment (D) may be about 6 μm to about 150 μm.

The light transmitting mother material (I) and the phosphorescent chip (II) may each independently further include a curing agent, a curing accelerator, and/or a cross-linking agent.

The curing agent may be included in the light transmitting mother material (I) and/or the phosphorescent chip (II) in an amount of about 1.0 part by weight to about 3.0 parts by weight based on about 100 parts by weight of the unsaturated polyester resin (A) and/or (A').

The curing accelerator may be included in the light transmitting mother material (I) and/or the phosphorescent chip (II) in an amount of about 0.1 part by weight to about 0.2 parts by weight based on about 100 parts by weight of the unsaturated polyester resin (A) and/or (A').

The cross-linking agent may be a silane-based cross-linking agent.

The cross-linking agent may be included in the light transmitting mother material (I) and/or the phosphorescent chip (II) in an amount of about 0.5 parts by weight to about 2.0 parts by weight based on about 100 parts by weight of the unsaturated polyester resin (A) and/or (A').

The engineered stone may have a diffuse transmittance of greater than or equal to about 6.0% and luminance after 1 hour of greater than or equal to about 7.0 mcd/m$^2$.

The phosphorescent chip (II) may be an amorphous phosphorescent chip.

Another embodiment of the present disclosure provides a method for manufacturing an engineered stone that includes:

preparing a phosphorescent resin composition (ii) including about 8 wt % to about 15 wt % of an unsaturated polyester resin (A') and about 85 wt % to about 92 wt % of a silica-containing compound (B') based on a total amount (total weight, 100 wt %) of the unsaturated polyester resin (A') and the silica-containing compound (B') of the phosphorescent chip (II), and further including a phosphorescent pigment (D), wherein the phosphorescent pigment (D) is included in an amount of about 2 parts by weight to about 10 parts by weight based on about 100 parts by weight of the unsaturated polyester resin (A'), wherein the silica-containing compound (B') includes about 20 wt % to about 30 wt % of a silica powder (b1') based on a total amount (total weight, 100 wt %) of the phosphorescent resin composition (ii);

dispersing the phosphorescent resin composition (ii) using a dispersing equipment;

vacuum-vibration-compression molding the phosphorescent resin composition (ii) dispersed to have a predetermined shape and molding it into a sheet having a phosphorescence effect;

crushing the sheet having the phosphorescence effect to prepare a phosphorescent chip (II);

preparing a light transmitting resin composition (i) including about 7 wt % to about 12 wt % of an unsaturated polyester resin (A) and about 88 wt % to about 93 wt % of a silica-containing compound (B) based on a total amount (total weight, 100 wt %) of the unsaturated polyester resin (A) and the silica-containing compound (B) of the light transmitting composition (i), and further including about 0.01 part by weight to about 1 part by weight of an organic/inorganic pigment (C) based on about 100 parts by weight of the unsaturated polyester resin (A);

mixing the light transmitting resin composition (i) with the phosphorescent chip (II) to prepare an engineered stone mixture;

dispersing the engineered stone mixture using a dispersing equipment to have a predetermined shape; and vacuum-vibration-compression molding a uniformly distributed engineered stone mixture to manufacture an engineered stone.

The silica-containing compound (B) may include a silica powder (b1) having an average particle diameter of greater than about 0 μm and less than or equal to about 45 μm, a silica sand (b2) having an average particle diameter of greater than or equal to about 0.1 mm and less than about 1.2 mm, and a quartz chip (b3) having an average particle diameter of greater than or equal to about 1.2 mm and less than or equal to about 6.0 mm, wherein the silica powder (b1) is included in an amount of about 20 wt % to about 30 wt % based on a total amount (total weight, 100 wt %) of the light transmitting resin composition (i), the silica sand (b2) is included in an amount of about 35 wt % to about 45 wt % based on a total amount (total weight, 100 wt %) of the light transmitting resin composition (i), and the quartz chip (b3) may be included in an amount of about 10 wt % to about 30 wt % based on a total amount (total weight, 100 wt %) of the light transmitting resin composition (i).

The silica-containing compound (B') may include a silica powder (b1') having an average particle diameter of greater than about 0 μm and less than or equal to about 45 μm and a silica sand (b2') having an average particle diameter of greater than or equal to about 0.1 mm and less than about 1.2 mm, wherein the silica sand (b2') may be included in an amount of about 60 wt % to about 70 wt % based on a total amount (total weight, 100 wt %) of the phosphorescent resin composition (ii).

The light transmitting resin composition (i) may further include about 1.0 part by weight to 3.0 parts by weight of a curing agent, about 0.1 part by weight to about 0.2 parts by weight of a curing accelerator, and/or about 0.5 parts by weight to about 2.0 parts by weight of a silane-based cross-linking agent, each based on about 100 parts by weight of the unsaturated polyester resin (A).

The phosphorescent resin composition (ii) may further include about 1.0 part by weight to 3.0 parts by weight of a curing agent, about 0.1 part by weight to about 0.2 parts by weight of a curing accelerator, and/or about 0.5 parts by weight to about 2.0 parts by weight of a silane-based cross-linking agent, each based on about 100 parts by weight of the unsaturated polyester resin (A').

The light transmitting resin composition (i) may be provided from a plurality of blenders.

The present disclosure may provide a resin-based engineered stone that can have excellent light transmittance and/or phosphorescence and can provide various differently appearing surface textures (appearances) depending on illumination of lighting (for example, depending on the type, location, and/or level of lighting).

DETAILED DESCRIPTION

Figure 1:
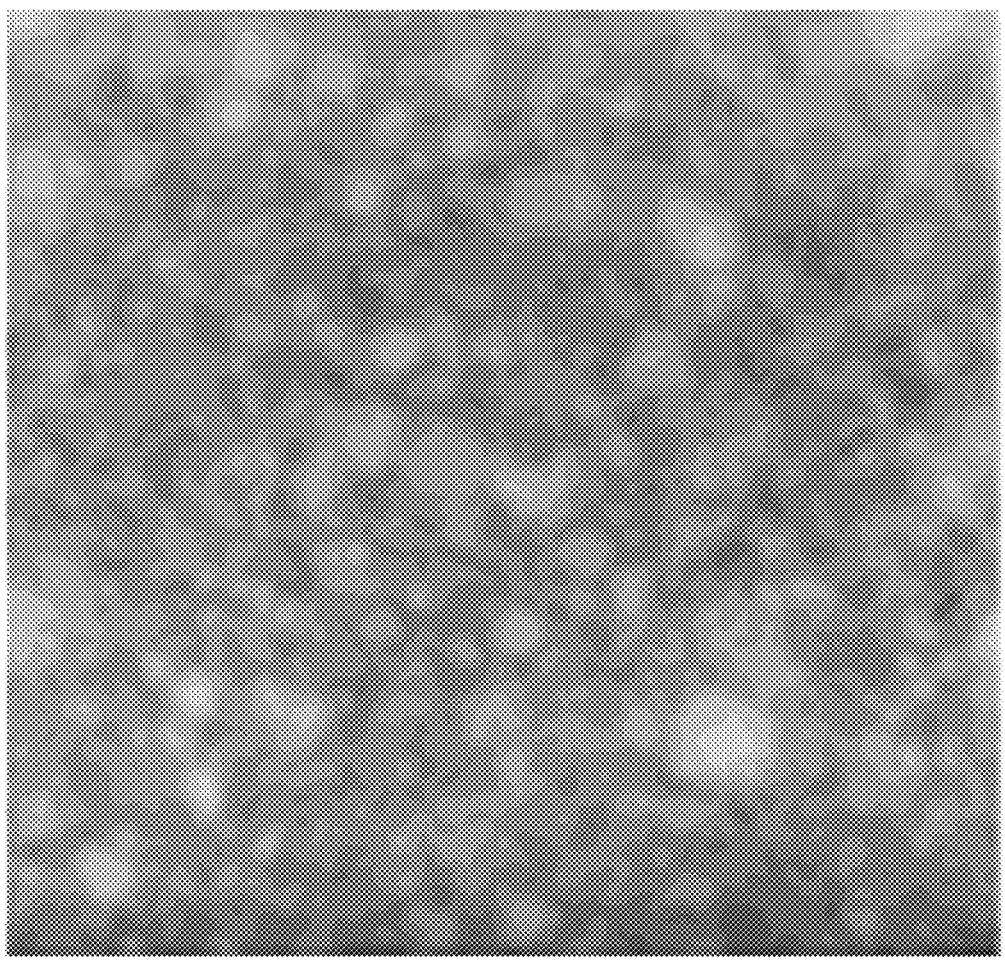
FIG. 1 is a photograph of an engineered stone according to an exemplary embodiment of the present disclosure being lighted behind it.

The present invention will be described more fully hereinafter with reference to the accompanying drawing, in which exemplary embodiments of the present invention are shown. This invention may, however, be embodied in many different forms and should not be construed as limited to the exemplary embodiments set forth herein. These exemplary embodiments disclosed in this specification are provided so that this disclosure will satisfy applicable legal requirements.

As used herein, when a specific definition is not otherwise provided, "substituted" refers to replacement of at least one hydrogen of a compound with one or more of a C1 to C30 alkyl group; a C1 to C10 alkylsilyl group; a C3 to C30 cycloalkyl group; a C6 to C30 aryl group; a C2 to C30 heteroaryl group; a C1 to C10 alkoxy group; a fluoro group, a C1 to C10 trifluoroalkyl group such as a trifluoromethyl group; and/or a cyano group.

As used herein, when a specific definition is not otherwise provided, the term "hetero" may refer to 1 to 3 heteroatoms selected from N, O, S, and/or P, in place of at least one carbon atom of a compound and/or a substituent.

As used herein, when a specific definition is not otherwise provided, the term "alkyl group" may refer to a "saturated alkyl group" without an alkene group and/or an alkyne group; or an "unsaturated alkyl group" including at least one of an alkene group and an alkyne group. The term "alkene group" may refer to a substituent in which at least two carbon atoms are bound with at least one carbon-carbon double bond, and the term "alkynyl group" refers to a substituent in which at least two carbon atoms are bound with at least one carbon-carbon triple bond. The alkyl group may be a branched, linear, and/or cyclic alkyl group.

The alkyl group may be a C1 to C20 alkyl group, for example a C1 to C6 lower alkyl group, a C7 to C10 middle alkyl group, and/or a C11 to C20 higher alkyl group.

The term "aromatic group" may refer a compound including a cyclic structure where all elements have p-orbitals which form conjugation. Examples thereof may include an aryl group and/or a heteroaryl group.

The term "aryl group" may refer to a monocyclic or fused ring-containing polycyclic (i.e., rings sharing adjacent pairs of carbon atoms) group.

The term "heteroaryl group" may refer to an aryl group including 1 to 3 heteroatoms selected from N, O, S, and/or P in aryl group, replacing one or more carbon atoms of the aryl group, with the remaining carbon atoms. When the heteroaryl group is a fused ring, each ring may include 1 to 3 heteroatoms.

As used herein, when a specific definition is not otherwise provided, the term "(meth)acrylate" refers to acrylate and/or methacrylate; the term "(meth)acrylic acid alkyl ester" refers to acrylic acid alkyl ester and/or methacrylic acid alkyl ester, and the term "(meth)acrylic acid ester" refers to acrylic acid ester and/or methacrylic acid ester.

As used herein, when a specific definition is not otherwise provided, the term "copolymerization" may refer to a block copolymerization, random copolymerization, graft copolymerization, and/or alternating copolymerization, and the term "copolymer" may refer to a block copolymer, a random copolymer, a graft copolymer, and/or an alternating copolymer.

Engineered Stone

In an embodiment of the present disclosure, an engineered stone includes a light transmitting mother material (I) and a phosphorescent chip (II).

Figure 2:
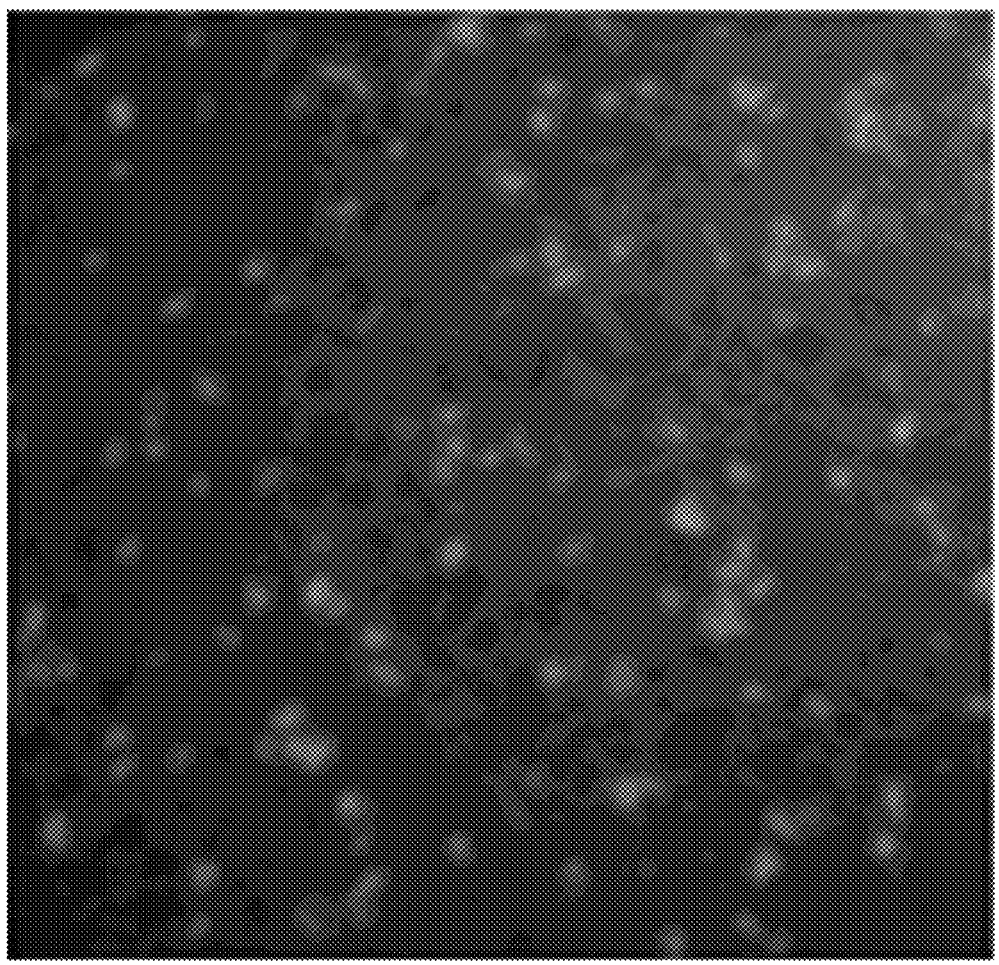
FIG. 2 is a photograph of an engineered stone according to an exemplary embodiment of the present disclosure under low illumination.
Figure 3:
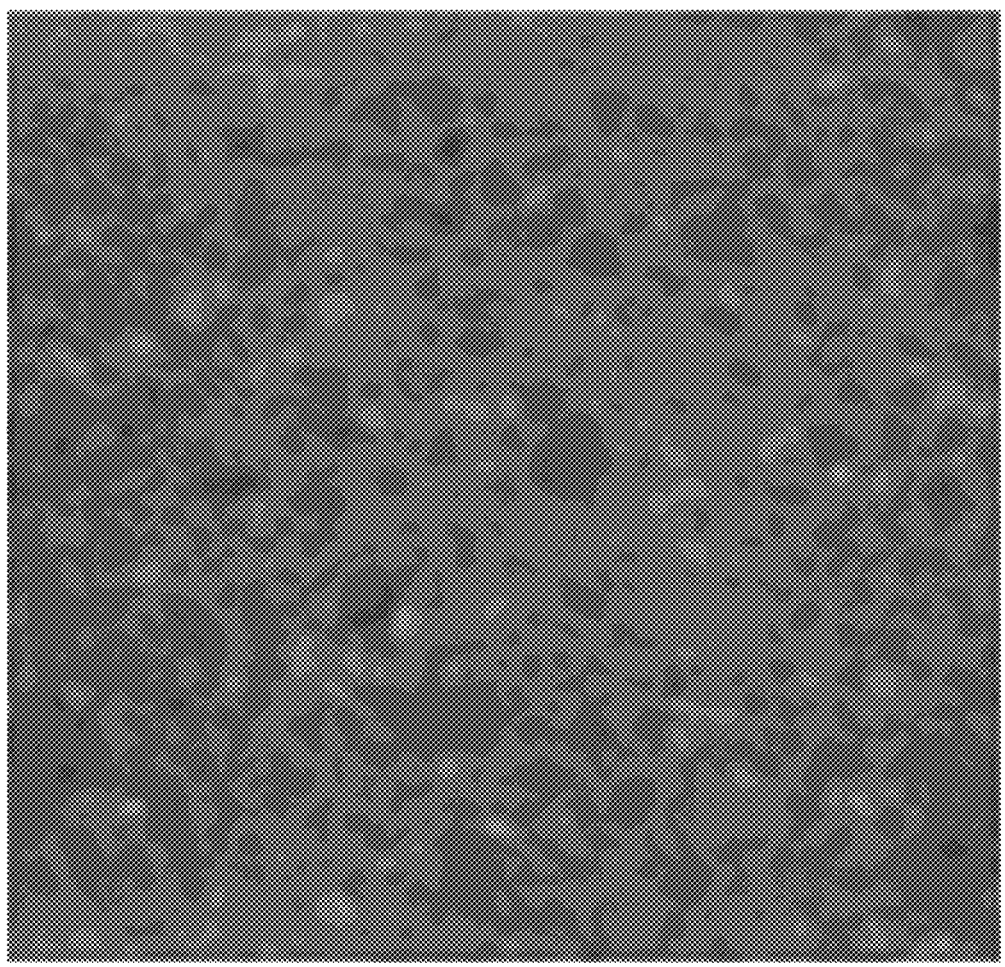
FIG. 3 is a photograph of an engineered stone according to an exemplary embodiment of the present disclosure under indoor light.

The engineered stone of the present disclosure may appear to have various different surface textures depending on illumination of light as shown in FIGS. 1 to 3.

The light transmitting mother material (I) includes an unsaturated polyester resin (A), a silica-containing compound (B), and an organic/inorganic pigment (C) as essential constituent elements, so that the engineered stone of the present disclosure may have an appearance and a texture close to those of a natural stone.

In exemplary embodiments of the present disclosure, the light transmitting mother material (I) includes about 7 wt % to about 12 wt % of an unsaturated polyester resin (A) and about 88 wt % to about 93 wt % of a silica-containing compound (B), each based on the total weight (100 wt %) of the unsaturated polyester resin (A) and the silica-containing compound (B), and further includes an organic/inorganic pigment (C).

For example, the light transmitting mother material (I) may include the organic/inorganic pigment (C) in an amount of 0.01 part by weight to 1 part by weight based on about 100 parts by weight of the unsaturated polyester resin (A).

In some embodiments, the light transmitting mother material (I) can include the unsaturated polyester resin (A) in an amount of about 7, 8, 9, 10, 11, or 12 wt %. Further, according to some embodiments, the amount of the unsaturated polyester resin (A) can be in a range from about any of the foregoing amounts to about any other of the foregoing amounts.

In some embodiments, the light transmitting mother material (I) can include the silica-containing compound (B) in an amount of about 88, 89, 90, 91, 92, or 93 wt %. Further, according to some embodiments, the amount of the silica-containing compound (B) can be in a range from about any of the foregoing amounts to about any other of the foregoing amounts.

In some embodiments, the light transmitting mother material (I) can include the organic/inorganic pigment (C) in an amount of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, or 1 parts by weight. Further, according to some embodiments, the amount of the organic/inorganic pigment (C) can be in a range from about any of the foregoing amounts to about any other of the foregoing amounts.

In contrast, the phosphorescent chip (II) includes an unsaturated polyester resin (A'), which can be the same or different from the unsaturated polyester resin (A), a silica-containing compound (B'), and a phosphorescent pigment (D) to apply/provide a partial phosphorescence effect to the engineered stone. In other words, the phosphorescent chip (II) has common or very similar components with the light transmitting mother material (I) except for using the phosphorescent pigment (D) instead of the organic/inorganic pigment (C) as a pigment component.

In exemplary embodiments of the present disclosure, the phosphorescent chip (II) includes about 8 wt % to about 15 wt % of an unsaturated polyester resin (A') and about 85 wt % to about 92 wt % of a silica-containing compound (B'), each based on the total amount (total weight, 100 wt %) of the unsaturated polyester resin (A') and the silica-containing compound (B'), and a phosphorescent pigment (D).

The phosphorescent chip (II) may include the phosphorescent pigment (D) in an amount of about 2 parts by weight to about 10 parts by weight based on about 100 parts by weight of the unsaturated polyester resin (A').

In some embodiments, the phosphorescent chip (II) can include the unsaturated polyester resin (A') in an amount of about 8, 9, 10, 11, 12, 13, 14, or 15 wt %. Further, according to some embodiments, the amount of the unsaturated polyester resin (A') can be in a range from about any of the foregoing amounts to about any other of the foregoing amounts.

In some embodiments, the phosphorescent chip (II) can include the silica-containing compound (B') in an amount of about 85, 86, 87, 88, 89, 90, 91, or 92 wt %. Further, according to some embodiments, the amount of the silica-containing compound (B') can be in a range from about any of the foregoing amounts to about any other of the foregoing amounts.

In some embodiments, the phosphorescent chip (II) can include the phosphorescent pigment (D) in an amount of about 2, 3, 4, 5, 6, 7, 8, 9, or 10 parts by weight. Further, according to some embodiments, the amount of the phosphorescent pigment (D) can be in a range from about any of the foregoing amounts to about any other of the foregoing amounts.

The phosphorescent chip (II) may be an amorphous phosphorescent chip.

A partial phosphorescent pattern of the engineered stone according to the present disclosure may be variously formed by controlling the amounts of the light transmitting mother material (I) and the phosphorescent chip (II).

In exemplary embodiments of the present disclosure, the engineered stone may include about 70 wt % to about 95 wt % of the light transmitting mother material (I) and about 5 wt % to about 30 wt % of the phosphorescent chip (II), for example about 80 wt % to about 90 wt % of a light transmitting mother material (I) and about 10 wt % to about 20 wt % of the phosphorescent chip (II), each based on the total weight (100 wt %) of the light transmitting mother material (I) and the phosphorescent chip (II).

In some embodiments, the engineered stone can include the light transmitting mother material (I) in an amount of about 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments, the amount of the light transmitting mother material (I) can be in a range from about any of the foregoing amounts to about any other of the foregoing amounts.

In some embodiments, the engineered stone can include the phosphorescent chip (II) in an amount of about 5, 6, 7, 8, 9, 10, 11, 12, 13, 14, 15, 16, 17, 18, 19, 20, 21, 22, 23, 24, 25, 26, 27, 28, 29, or 30 wt %. Further, according to some embodiments, the amount of the phosphorescent chip (II) can be in a range from about any of the foregoing amounts to about any other of the foregoing amounts.

When the phosphorescent chip (II) is included in an amount of less than about 5 wt %, the phosphorescent pattern may not be appropriately formed. When the phosphorescent chip (II) is included in an amount of greater than about 30 wt %, a texture of a natural stone may not be realized.

When the light transmitting mother material (I) and the phosphorescent chip (II) are mixed in the above ratio, the phosphorescent pattern may cover about 5 wt % to about 30 wt % of the surface area of the engineered stone, for example, about 10 wt % to about 20 wt % of the surface area of the engineered stone and thus form a natural texture.

The engineered stone of the present disclosure may have diffusion transmittance of greater than or equal to about 6.0% and one hour later, maintain luminance of greater than or equal to about 7.0 mcd/m$^2$.

Hereinafter, each component of the engineered stone according to the present disclosure is discussed.

(A, A') Unsaturated Polyester Resin

In the present disclosure, a resin component surrounds a natural stone particle and a mineral filler forming a frame of the engineered stone, plays a role of bonding the whole along with a cross-linking agent, and applies elastic or tensile strength to the engineered stone.

The present disclosure uses an unsaturated polyester resin (UPE resin) having an excellent bonding force with the natural stone particle and the like as the resin component.

The unsaturated polyester resin (A) and (A') may be the same or a different unsaturated polyester resin.

The unsaturated polyester resin (A) and/or (A') used in the present disclosure is well known in this art, may be an esterification product of a polybasic acid and a polyvalent alcohol, wherein at least one or more of the polybasic acid and/or the polyvalent alcohol compound includes an unsaturated moiety.

Polycarboxylic acid, polycarboxylic anhydride, polycarboxylic acid halide, and/or polycarboxylate ester may be used as the polybasic acid. Examples of the unsaturated polybasic acid may include without limitation maleic acid, maleic anhydride, fumaric acid, chloromaleic acid, ethylmaleic acid, itaconic acid, citraconic acid, geronic acid (2,2-dimethyl-6-oxoheptanoic acid), mesaconic acid, aconic acid, ethylene dicarboxylic acid, and the like, and mixtures thereof. Examples of a saturated polybasic acid may include without limitation phthalic acid, isophthalic acid, terephthalic acid, succinic acid, and the like, and mixtures thereof. Mixtures of unsaturated and/or saturated polybasic acids may also be used.

Examples of a saturated polyvalent alcohol may include without limitation divalent alcohols such as ethylene glycol, diethylene glycol, propylene glycol, dipropylene glycol, 1,3-butanediol, 1,6-hexanediol, neopentyl glycol, and/or 1,4-cyclohexanediol; trivalent alcohols such as glycerin; tetravalent alcohol such as pentaerythritol; and the like and mixtures thereof. Examples of unsaturated polyhydric alcohols may include without limitation butene diol, pentene diol, allyl and/or vinyl glycerol ether, allyl and/or vinyl pentaerythritol, and the like, and mixtures thereof. Mixtures of unsaturated and/or saturated polyvalent alcohols may also be used.

The unsaturated polyester resin may have a weight average molecular weight ranging from about 70,000 g/mol to about 100,000 g/mol. The larger the molecular weight the unsaturated polyester resin has, the more excellent bonding force with the natural stone particle it has. Thus, the unsaturated polyester resin may effectively fix the natural stone particle exposed to/on the exterior surface of the engineered stone, even though a part of the resin is polished off during a polishing process. When the unsaturated polyester resin has a weight average molecular weight of less than about 70,000 g/mol, the natural stone particle may be displaced/removed from the surface of the engineered stone. When the unsaturated polyester resin has a weight average molecular weight of greater than about 10,000 g/mol, the viscosity of the unsaturated polyester resin may be too high so that it may not mix well with the natural stone particle.

The light transmitting mother material (I) may include the unsaturated polyester resin (A) in an amount of about 7 wt % to about 12 wt % based on 100 wt % of the unsaturated polyester resin (A) and the silica-containing compound (B).

The phosphorescent chip (II) may include the unsaturated polyester resin (A') in an amount of about 8 wt % to about 15 wt % based on 100 wt % of the unsaturated polyester resin (A') and the silica-containing compound (B').

When the unsaturated polyester resin is included in an amount of less than about 7 wt % in the light transmitting mother material (I) and/or in an amount of less than about 8 wt % in the phosphorescent chip (II), the bonding force with the natural stone particle may be deteriorated. When the unsaturated polyester resin is included in an amount of greater than about 12 wt % in the light transmitting mother material (I) and/or in an amount of greater than about 15 wt % in the phosphorescent chip (II), an appearance and/or a texture of a natural stone may be lost.

(B, B') Silica-containing Compound

The light transmitting mother material (I) may include the silica-containing compound (B) in an amount of about 88 wt % to about 93 wt % based on 100 wt % of the unsaturated polyester resin (A) and the silica-containing compound (B).

The phosphorescent chip (II) may include the silica-containing compound (B') in an amount of about 85 wt % to about 92 wt % based on 100 wt % of the unsaturated polyester resin (A') and the silica-containing compound (B').

When the silica-containing compound (B, B') is included in a large amount such as the ranges herein, an appearance and/or a texture similar to those of a natural stone may be obtained.

The silica-containing compound (B) may include a silica powder (b1), a silica sand (b2), and a quartz chip (b3).

An average particle diameter of the silica powder (b1) may be greater than about 0 μm and less than or equal to about 45 μm, an average particle diameter of the silica sand (b2) may be greater than or equal to about 0.1 mm and less than about 1.2 mm, and an average particle diameter of the quartz chip (b3) may be greater than or equal to about 1.2 mm and less than or equal to about 6.0 mm. The average particle size is measured by HELOS (light diffraction particle size analyzer, Sympatec Ltd.) and RODOS/M. The specific gravity of the silica powder (b1) is 2.65.

The average particle size of the silica sand (b2) and the quartz chip (b3) is not the same.

In some embodiments, the silica powder (b1) can have an average particle diameter of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, or 45 μm. In some embodiments, the silica sand (b2) can have an average particle diameter of about 0.1, 0.2, 0.3, 0.4, 0.5, 0.6, 0.7, 0.8, 0.9, 1, or 1.1 mm. In some embodiments, the quartz chip (b3) can have an average particle diameter of about 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, or 6.0 mm.

The light transmitting mother material (I) can include the silica powder (b1) in an amount of about 20 wt % to about 30 wt %, the silica sand (b2) in an amount of about 35 wt % to about 45 wt %, and the quartz chip (b3) in an amount of about 10 wt % to about 30 wt %, each based on a total amount (total weight, 100 wt %) of the light transmitting mother material (I).

The ranges of the silica powder (b1), the silica sand (b2), and the quartz chip (b3) may be appropriate in terms of a phosphorescence effect and a cost.

In some embodiments, the light transmitting mother material (I) can include the silica powder (b1) in an amount of about 20, 21, 22, 23, 24, 25, 26, 27, 28, 29, or 30 wt %. Further, according to some embodiments, the amount of the silica powder (b1) can be in a range from about any of the foregoing amounts to about any other of the foregoing amounts.

In some embodiments, the light transmitting mother material (I) can include the silica sand (b2) in an amount of about 35, 36, 37, 38, 39, 40, 41, 42, 43, 44, or 45 wt %. Further, according to some embodiments, the amount of the the silica sand (b2) can be in a range from about any of the foregoing amounts to about any other of the foregoing amounts.

In some embodiments, the light transmitting mother material (I) can include the quartz chip (b3) in an amount of about 10, 11, 12, 13, 14, 15, 16, 17, 18, 19, 20, 21, 22, 23, 24, 25, 26, 27, 28, 29, or 30 wt %. Further, according to some embodiments, the amount of the the quartz chip (b3) can be in a range from about any of the foregoing amounts to about any other of the foregoing amounts.

When the silica sand (b2) is included in an amount of about 35 wt % to about 45 wt % based on a total amount of the light transmitting mother material (I), and simultaneously, the quartz chip (b3) is included in an amount of about 10 wt % to about 30 wt % based on a total amount of the light transmitting mother material (I), an excellent texture of a natural stone may not be obtained, but diffusion transmittance may be much improved, and thus various surface textures depending on illumination of light may be realized.

The silica-containing compound (B') may include a silica powder (b1') and a silica sand (b2').

The silica powder (b1') and the silica sand (b2') are the same as the silica powder (b1) and silica sand (b2) described above.

The phosphorescent chip (II) can include the silica powder (b1') in an amount of about 20 wt % to about 30 wt % and the silica sand (b2') in an amount of about 60 wt % to about 70 wt %, each based on a total amount (total weight, 100 wt %) of the phosphorescent chip (II).

In some embodiments, the phosphorescent chip (II) can include the silica powder (b1') in an amount of about 20, 21, 22, 23, 24, 25, 26, 27, 28, 29, or 30 wt %. Further, according to some embodiments, the amount of the silica powder (b1') can be in a range from about any of the foregoing amounts to about any other of the foregoing amounts.

In some embodiments, the phosphorescent chip (II) can include the silica sand (b2') in an amount of about 60, 61, 62, 63, 64, 65, 66, 67, 68, 69, or 70 wt %. Further, according to some embodiments, the amount of the the silica sand (b2') can be in a range from about any of the foregoing amounts to about any other of the foregoing amounts.

When the silica sand is included in an amount of about 60 wt % to about 70 wt % based on a total amount of the phosphorescent chip (II), diffusion transmittance may be much improved, and thus various surface textures depending on illumination of light may be obtained.

(C) Organic Pigment and/or Inorganic Pigment

In the present disclosure, an organic/inorganic pigment may be further included to diversify a phosphorescent color. The organic/inorganic pigment may be azo-based and/or phthalocyanine-based and may be used in an amount of about 0.01 parts by weight to about 1 part by weight based on about 100 parts by weight of the unsaturated polyester resin (A).

(D) Phosphorescent Pigment

Any general phosphorescent pigment applying/imparting phosphorescence to the engineered stone of the present disclosure may be used without any particular limit. In exemplary embodiments, a strontium aluminate-based pigment and/or a zinc sulfide-based pigment may be used.

The phosphorescent pigment may have an average particle diameter ranging from about 6 μm to about 150 μm. In some embodiments, the phosphorescent pigment can have an average particle diameter of about 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149 or 150 μm. The average particle size is measured by HELOS (light diffraction particle size analyzer, Sympatec Ltd.) and RODOS/M. The specific gravity of the phosphorescent pigment is 4.0.

When the phosphorescent pigment has an average particle diameter of less than about 6 μm, light emitting performance may be deteriorated. When the phosphorescent pigment has an average particle diameter of greater than about 150 μm, a photo-radiation time for its initial saturation state may be longer. The phosphorescent pigment can be expensive and thus can be used at a minimum ratio to maximize light emitting performance of the engineered stone. In exemplary embodiments, the phosphorescent pigment can be used in an amount of about 2 parts by weight to about 10 parts by weight based on about 100 parts by weight of the unsaturated polyester resin (A').

When the phosphorescent pigment is used in an amount of less than about 2 parts by weight according to the mixing ratio of the present disclosure, a sufficient phosphorescence effect may not be obtained. When the phosphorescent pigment is used in an amount of greater than about 10 parts by weight, and as another example greater than about 5 parts by weight, use of the phosphorescent pigment may not be economical and/or improve phosphorescence performance.

(E) Other Additives

In the present disclosure, the light transmitting mother material (I) and/or the phosphorescent chip (II) may each independently include a curing agent (e1) in order to cure an engineered stone and a curing accelerator (e2) in order to enhance a curing reaction. The curing agent may independently be used in amount of about 1.0 part by weight to about 3.0 parts by weight based on about 100 parts by weight of the polyester resin (A) and/or (A'), and the curing accelerator may independently be used in amount of about 0.1 part by weight to about 0.2 parts by weight based on about 100 parts by weight of the polyester resin (A) and/or (A').

In addition, the light transmitting mother material (I) and/or the phosphorescent chip (II) may each independently include a cross-linking agent (e3) to bond the unsaturated polyester resin (A) and/or (A') with the natural stone particle. The cross-linking agent may be a silane-based cross-linking agent and may independently be used in an amount of about 0.5 parts by weight to about 2.0 parts by weight based on about 100 parts by weight of the polyester resin (A) and/or (A').

Method of Manufacturing Engineered Stone

The engineered stone of the present disclosure may consist of the light transmitting mother material (I) and the phosphorescent chip (II).

Preparation of Phosphorescent Chip (II)

The preparation of the phosphorescent chip can include preparing a phosphorescent resin composition (ii), dispersing the phosphorescent resin composition (ii) using a dispersing equipment, vacuum-vibration-compression molding the phosphorescent resin composition (ii) dispersed to have a predetermined shape and molding it into a sheet having a phosphorescence effect, and crushing the sheet having the phosphorescence effect to prepare a phosphorescent chip.

The sheet may be crushed to provide phosphorescent chips with an average particle size of about 4.0 mm to about 10.0 mm. The average particle size is measured by HELOS (light diffraction particle size analyzer, Sympatec Ltd.) and RODOS/M.

In the preparation of the phosphorescent resin composition (ii), about 8 wt % to about 15 wt % of an unsaturated polyester resin (A'), about 85 wt % to about 92 wt % of a silica-containing compound (B'), and a phosphorescent pigment (D) are mixed, wherein the phosphorescent pigment (D) is included in an amount of about 2 parts by weight to about 10 parts by weight based on about 100 parts by weight of the unsaturated polyester resin (A').

The silica-containing compound (B') includes a silica powder (b1') and optionally a silica sand (b2'). The silica powder (b1') has an average particle diameter of greater than about 0 μm and less than or equal to about 45 μm, and the silica sand (b2') has an average particle diameter of greater than or equal to about 0.1 mm and less than about 1.2 mm. The silica powder (b1') may be included in an amount of about 20 wt % to about 30 wt % based on a total amount (total weight, 100 wt %) of the phosphorescent resin composition (ii), and the silica sand (b2') may be included in an amount of about 60 wt % to about 70 wt % based on a total amount (total weight, 100 wt %) of the phosphorescent resin composition (ii).

In addition, the phosphorescent resin composition (ii) may further include about 1.0 part by weight to about 3.0 parts by weight of a curing agent, about 0.1 part by weight to 0.2 parts by weight of a curing accelerator, and about 0.5 parts by weight to about 2.0 parts by weight of a silane-based cross-linking agent, each based on about 100 parts by weight of the unsaturated polyester resin (A').

Preparation of Light Transmitting Resin Composition (i)

The light transmitting resin composition (i) forming a part of the light transmitting mother material (I) is prepared by mixing the unsaturated polyester resin (A), the silica-containing compound (B), and the organic/inorganic pigment (C) with a mixer.

The light transmitting resin composition (i) includes about 7 wt % to about 12 wt % of the unsaturated polyester resin (A) and about 88 wt % to about 93 wt % of the silica-containing compound (B) and further includes about 0.01 part by weight to about 1 part by weight of organic/inorganic pigment (C) based on about 100 parts by weight of the unsaturated polyester resin (A).

The silica-containing compound (B) may include a silica powder (b1) having an average particle diameter of greater than about 0 μm and less than or equal to about 45 μm, a silica sand (b2) having an average particle diameter of greater than or equal to about 0.1 mm and less than about 1.2 mm, and a quartz chip (b3) having an average particle diameter of greater than or equal to about 1.2 mm and less than or equal to about 6.0 mm.

The silica powder (b1) may be included in an amount of about 20 wt % to about 30 wt % based on a total amount (total weight, 100 wt %) of the light transmitting resin composition (i), the silica sand (b2) may be included in an amount of about 35 wt % to about 45 wt % based on a total amount (total weight, 100 wt %) of the light transmitting resin composition (i), and the quartz chip (b3) may be included in an amount of about 10 wt % to about 30 wt % based on a total amount (total weight, 100 wt %) of the light transmitting resin composition (i).

In addition, the light transmitting resin composition (i) may further include about 1.0 part by weight to 3.0 parts by weight of a curing agent, about 0.1 part by weight to about 0.2 parts by weight of a curing accelerator, and about 0.5 parts by weight to about 2.0 parts by weight of a silane-based cross-linking agent, each based on about 100 parts by weight of the unsaturated polyester resin (A).

Mixing Light Transmitting Resin Composition (i) and Phosphorescent Chip

The engineered stone may be manufactured by preparing the light transmitting resin composition (i), mixing the light transmitting resin composition (i) with the phosphorescent chip (II) to prepare an engineered stone mixture, dispersing the engineered stone mixture with a dispersing equipment into a predetermined shape, and then, vacuuming, vibrating, compressing, and molding the uniformly dispersed engineered stone mixture.

When the light transmitting resin composition (i) and the phosphorescent chip (II) are prepared, about 70 wt % to about 95 wt % of the light transmitting resin composition (i) and about 5 wt % to about 30 wt % of the phosphorescent chip (II) are mixed to prepare the engineered stone mixture.

When the engineered stone mixture is prepared, the light transmitting resin composition (i) may be divided and supplied from a plurality of mixers to control a supply speed.

The prepared engineered stone mixture can be supplied in a sheet shape into a load plate, vacuum-vibration-compression-molded, and then, cured and cooled down into a slab as a half finished product, and the slab can be processed into the engineered stone.

Hereinafter, the present disclosure is illustrated in more detail with reference to examples and comparative examples. However, the following examples and comparative examples are provided for the purpose of illustration only and the present invention is not limited thereto.

EXAMPLE

Preparation of Samples
(A, A') Unsaturated Polyester (UPE) Resin
A M900 unsaturated polyester (UPE) resin made by Aekyung Chemical Co., Ltd. is used.

(B, B') Silica-containing Compound
(b1, b1') Silica Powder
Silica powder having an average particle diameter of greater than 0 μm and 45 μm and made by 21$^{st}$ Century Silica Ltd. is used.
(b2, b2') Silica Sand
Silica sand having an average particle diameter of greater than or equal to about 0.1 mm and less than about 1.2 mm and made by Microman (Turkey) is used.
(b3) Quartz Chip
A quartz chip having an average particle diameter of greater than or equal to about 1.2 mm and less than or equal to about 6.0 mm and made by 21$^{st}$ Century Silica Ltd. is used.
(C) Organic/inorganic Pigment
TR92, 318M, Y8G, Y6R, and R110 pigments made by Wooshin Pigment Co., Ltd. are used.
(D) Phosphorescent Pigment
A PL-120 phosphorescent pigment having an average particle diameter of 25 μm and made by Sachiro is used.
(E) Other additives
(e1) TBPB (Luperox P, Seiki Arkema Co., Ltd.) as a curing agent is used.
(e2) 6%-Cobalt made by Jinyang Chemical is used as a curing accelerator.
(e3) A WD70 silane-based coupling agent made by Gudam is used as a cross-linking agent.
Property Evaluation Method
(1) Diffusion transmittance: measured with NDH-5000 in a ASTM D 1003 measurement method to evaluate a light transmittance effect.
(2) Phosphorescence luminance: measured according to KS A 3505 at 5 minutes, 10 minutes, 20 minutes, and 60 minutes after radiating light of 200 lux for 20 minutes with DN65 of a commercial light source into a sample having an area of 201.6 cm$^2$ from a distance of 0.25 m to evaluate a phosphorescent chip effect.

EXAMPLES AND COMPARATIVE EXAMPLES

The components are added as shown in Table 1 to prepare each light transmitting resin composition (i) and also, as shown in Table 2 to prepare each phosphorescent resin composition (ii), and each phosphorescent chip (II) is prepared from the phosphorescent resin composition (ii).

The phosphorescent chips (II) are respectively added to the light transmitting resin composition (i) and dispersed therein and then, vacuum-vibration-compression molded to manufacture engineered stones. Properties of the engineered stones are measured. The results are shown in Table 3.

TABLE 1

| | | Examples 1 and 2 | Comparative Example 1 | Comparative Example 2 | Comparative Example 3 | Comparative Example 4 |
|---|---|---|---|---|---|---|
| (A) unsaturated polyester (UPE) resin (wt %) | | 7.9 | 13.00 | 13.00 | 7.9 | 6.0 |
| (B) silica-containing compound (wt %) | (b1) silica powder | 23.7 | 25.5 | 25.8 | 23.7 | 25.6 |
| | (b2) silica sand | 40.6 | 37.0 | 52.1 | 40.6 | 40.6 |
| | (b3) quartz chip | 27.8 | 24.5 | 9.1 | 27.8 | 27.8 |
| (C) organic/inorganic pigment (parts by weight relative to 100 parts by weight of the UPE resin) | | 0.01 | 0.01 | 0.01 | 0.15 | 0.01 |
| (E) other additive (parts by weight relative to 100 parts by weight of the UPE resin) | (e1) curing agent | 2.0 | 2.0 | 2.0 | 2.0 | 2.0 |
| | (e2) curing accelerator | 0.1 | 0.1 | 0.1 | 0.1 | 0.1 |
| | (e3) cross-linking agent | 1.0 | 1.0 | 1.0 | 1.0 | 1.0 |

TABLE 2

|  |  | Example 1 | Example 2 | Comparative Example 1 | Comparative Example 2 | Comparative Example 3 | Comparative Example 4 |
|---|---|---|---|---|---|---|---|
| (A') unsaturated polyester (UPE) resin (wt %) | | 10.0 | 12.0 | 7.0 | 10.0 | 10.0 | 10.0 |
| (B') silica-containing compound (wt %) | (b') silica powder | 25.0 | 28.0 | 28.0 | 35.0 | 22.0 | 35.0 |
| | (b2') silica sand | 65.0 | 60.0 | 63.0 | 53.0 | 67.0 | 53.0 |
| (D) phosphorescent pigment (parts by weight relative to 100 parts by weight of the UPE resin) | | 2.0 | 2.0 | 2.0 | 2.0 | 1.0 | 2.0 |
| (E) other additive (parts by weight relative to 100 parts by weight of the UPE resin) | (e1) curing agent | 2.0 | 2.0 | 2.0 | 2.0 | 2.0 | 2.0 |
| | (e2) curing accelerator | 0.1 | 0.1 | 0.1 | 0.1 | 0.1 | 0.1 |
| | (e3) cross-linking agent | 1.0 | 1.0 | 1.0 | 1.0 | 1.0 | 1.0 |

TABLE 3

| | Example 1 | Example 2 | Comparative Example 1 | Comparative Example 2 | Comparative Example 3 | Comparative Example 4 |
|---|---|---|---|---|---|---|
| Diffuse transmittance | 7.29 | 6.7 | 5.51 | 4.17 | 1.05 | 0.8 |
| Luminance/1 hour | 10 | 8 | 4 | 3 | 2 | 2 |

Referring to Tables 1 to 3 and FIGS. 1 to 3, the engineered stones according to Examples 1 and 2 exhibit excellent diffusion transmittance and luminance compared with the engineered stones according to Comparative Examples 1 to 4 and thus can provide various product patterns depending on illumination of light.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. An engineered stone, comprising
a light transmitting mother material (I) and a phosphorescent chip (II),
wherein the light transmitting mother material (I) includes about 7 wt % to about 12 wt % of an unsaturated polyester resin (A) and about 88 wt % to about 93 wt % of a silica-containing compound (B) based on a total amount of the unsaturated polyester resin (A) and the silica-containing compound (B) of the light transmitting mother material (I),
the light transmitting mother material (I) further includes about 0.01 part by weight to about 1 part by weight of an organic/inorganic pigment (C) based on about 100 parts by weight of the unsaturated polyester resin (A),
the phosphorescent chip (II) includes about 8 wt % to about 15 wt % of an unsaturated polyester resin (A') and about 85 wt % to about 92 wt % of a silica-containing compound (B') based on a total amount of the unsaturated polyester resin (A') and the silica-containing compound (B') of the phosphorescent chip (II),
the phosphorescent chip (II) further includes 2 parts by weight to 5 parts by weight of a phosphorescent pigment (D) based on 100 parts by weight of the unsaturated polyester resin (A'), and
the silica-containing compound (B') includes about 20 wt % to about 30 wt % of a silica powder (b1') based on a total amount of the phosphorescent chip (II).

2. The engineered stone of claim 1, wherein the silica-containing compound (B) includes a silica powder (b1), a silica sand (b2), and a quartz chip (b3).

3. The engineered stone of claim 2, wherein an average particle diameter of the silica powder (b1) is greater than about 0 μm and less than or equal to about 45 μm, an average particle diameter of the silica sand (b2) is greater than or equal to about 0.1 mm and less than about 1.2 mm, and an average particle diameter of the quartz chip (b3) is greater than or equal to about 1.2 mm and less than or equal to about 6.0 mm.

4. The engineered stone of claim 2, wherein the light transmitting mother material (I) includes:
the silica powder (b1) in an amount of about 20 wt % to about 30 wt % based on a total amount of the light transmitting mother material (I),
the silica sand (b2) in an amount of about 35 wt % to about 45 wt % based on a total amount of the light transmitting mother material (I), and
the quartz chip (b3) in an amount of about 10 wt % to about 30 wt % based on a total amount of the light transmitting mother material (I).

5. The engineered stone of claim 1, wherein the silica-containing compound (B') further includes silica sand (b2').

6. The engineered stone of claim 5, wherein an average particle diameter of the silica powder (b1') is greater than about 0 μm and less than or equal to about 45 μm and an average particle diameter of the silica sand (b2') is greater than or equal to about 0.1 mm and less than about 1.2 mm.

7. The engineered stone of claim 5, wherein the phosphorescent chip (II) includes the silica sand (b2') in an amount of about 60 wt % to about 70 wt % based on a total amount of the phosphorescent chip (II).

8. The engineered stone of claim 1, wherein the light transmitting mother material (I) and the phosphorescent chip (II) each further independently include a curing agent, a curing accelerator, and/or a cross-linking agent.

9. The engineered stone of claim 8, wherein the cross-linking agent is a silane-based cross-linking agent.

10. The engineered stone of claim 1, wherein the engineered stone has a diffuse transmittance of greater than or equal to about 6.0% and maintains luminance of greater than or equal to 7.0 mcd/m$^2$ after one hour.

11. The engineered stone of claim 1, wherein the phosphorescent chip (II) is an amorphous phosphorescent chip.

12. A method for manufacturing an engineered stone, comprising
preparing a phosphorescent resin composition (ii) including about 8 wt % to about 15 wt % of an unsaturated polyester resin (A'), about 85 wt % to about 92 wt % of a silica-containing compound (B'), and a phosphorescent pigment (D), wherein the phosphorescent pigment (D) is included in an amount of 2 parts by weight to 5 parts by weight based on 100 parts by weight of the unsaturated polyester resin (A'), and the silica-containing compound (B') includes about 20 wt % to about 30 wt % of a silica powder (b1') based on a total amount of the phosphorescent resin composition (ii);
dispersing the phosphorescent resin composition (ii) using a dispersing equipment;
vacuum-vibration-compression molding the phosphorescent resin composition (ii) dispersed to have a predetermined shape and molding it into a sheet having a phosphorescence effect;
crushing the sheet having the phosphorescence effect to prepare a phosphorescent chip (II);
preparing a light transmitting resin composition (i) including about 7 wt % to about 12 wt % of an unsaturated polyester resin (A) and about 88 wt % to about 93 wt % of a silica-containing compound (B) based on a total amount of the unsaturated polyester resin (A) and the silica containing compound (B) of the light transmitting resin composition, and further including about 0.01 part by weight to about 1 part by weight of an organic/inorganic pigment (C) based on about 100 parts by weight of the unsaturated polyester resin (A');
mixing the light transmitting resin composition (i) with the phosphorescent chip (II) to prepare an engineered stone mixture;
dispersing the engineered stone mixture using a dispersing equipment to have a predetermined shape; and
vacuum-vibration-compression molding a uniformly distributed engineered stone mixture to manufacture an engineered stone.

13. The method of claim 12, wherein the silica-containing compound (B) includes a silica powder (b1) having an average particle diameter of greater than about 0 μm and less than or equal to about 45 μm, a silica sand (b2) having an average particle diameter of greater than or equal to about 0.1 mm and less than about 1.2 mm, and a quartz chip (b3) having an average particle diameter of greater than or equal to about 1.2 mm and less than or equal to about 6.0 mm, and
the silica powder (b1) is included in an amount of about 20 wt % to about 30 wt % based on a total amount of the light transmitting resin composition (i), the silica sand (b2) is included in an amount of about 35 wt % to about 45 wt % based on a total amount of the light transmitting resin composition (i), and the quartz chip (b3) included in an amount of about 10 wt % to about 30 wt % based on a total amount of the light transmitting resin composition (i).

14. The method of claim 12, wherein the silica-containing compound (B') includes a silica powder (b1') having an average particle diameter of greater than about 0 μm and less than or equal to about 45 μm and a silica sand (b2') having an average particle diameter of greater than or equal to about 0.1 mm and less than about 1.2 mm, and
the silica sand (b2') is included in an amount of about 60 wt % to about 70 wt % based on a total amount of the phosphorescent resin composition (ii).

\* \* \* \* \*